(12) United States Patent
Hammer et al.

(10) Patent No.: US 7,726,451 B2
(45) Date of Patent: Jun. 1, 2010

(54) VIBRATION DAMPER WITH AMPLITUDE-SELECTIVE DAMPING FORCE

(75) Inventors: Thomas Hammer, Bischofsheim (DE);
Michael Doppernas, Priesendorf (DE);
Manfred Denner, Maßbach (DE);
Matthias Planitzer, Röthlein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 680 days.

(21) Appl. No.: 11/524,742

(22) Filed: Sep. 21, 2006

(65) Prior Publication Data
US 2007/0080034 A1 Apr. 12, 2007

(30) Foreign Application Priority Data
Sep. 22, 2005 (DE) .................. 10 2005 045 267

(51) Int. Cl.
*F16F 9/508* (2006.01)
(52) U.S. Cl. .................. 188/280; 188/282.1; 188/282.6; 188/282.8; 188/322.15; 188/320
(58) Field of Classification Search .................. 188/280, 188/281, 282.1, 282.5, 282.6, 282.8, 284, 188/313, 316, 317, 320, 322.13, 322.15
See application file for complete search history.

(56) References Cited

U.S. PATENT DOCUMENTS

| | | | | | |
|---|---|---|---|---|---|
| 2,369,007 | A | * | 2/1945 | Beecher | 188/281 |
| 2,487,471 | A | * | 11/1949 | Patriquin | 188/320 |
| 2,497,972 | A | * | 2/1950 | Beecher | 188/316 |
| 2,507,267 | A | * | 5/1950 | Patriquin | 188/320 |
| 4,099,602 | A | * | 7/1978 | Kourbetsos | 188/316 |
| 4,503,951 | A | * | 3/1985 | Imaizumi | 188/317 |
| 5,823,306 | A | * | 10/1998 | de Molina | 188/320 |
| 6,352,145 | B1 | | 3/2002 | DeMolina et al. | |
| 6,651,787 | B2 | * | 11/2003 | Grundei | 188/322.15 |
| 7,073,642 | B2 | * | 7/2006 | Keller et al. | 188/282.5 |

(Continued)

FOREIGN PATENT DOCUMENTS

DE 44 27 273 2/1995

(Continued)

OTHER PUBLICATIONS

German Search Report dated Jan. 16, 2007 issued in corresponding application No. 06018428.0.

*Primary Examiner*—Thomas J Williams
(74) *Attorney, Agent, or Firm*—Cohen Pontani Lieberman & Pavane LLP

(57) ABSTRACT

A vibration damper with amplitude-selective damping force includes a piston rod carrying a piston arrangement axially movably arranged in a cylinder and dividing the cylinder into two working spaces. A flow connection is present between the working spaces and controlled by an axially movable switching ring which cooperates with a working surface which faces the ring to define a pilot opening cross section. A bypass channel with at least two connecting openings to the flow connection is provided hydraulically in parallel to the flow connection. At least one connecting opening upstream of each of two stop surface of the switching ring. A check valve arrangement separates the bypass channel and the flow connection from each other in the different flow directions as a function of the movements of the piston rod, the check valve arrangement having two check valves which close in opposite directions.

18 Claims, 22 Drawing Sheets

U.S. PATENT DOCUMENTS 7,523,818 B2 * 4/2009 Hammer et al. ........ 188/322.15

FOREIGN PATENT DOCUMENTS

| DE | 197 49 356 | 6/1998 |
| DE | 199 48 328 | 4/2000 |
| DE | 197 38 617 | 3/2003 |
| DE | 197 49 356 | 8/2004 |
| JP | 04102737 | 4/1992 |

* cited by examiner

Fig. 4
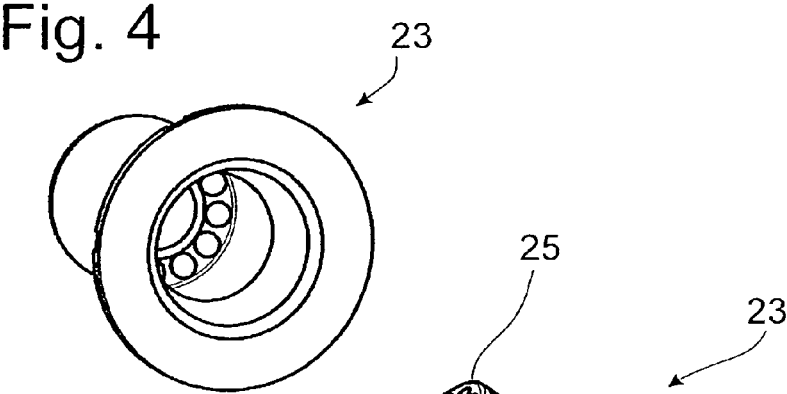
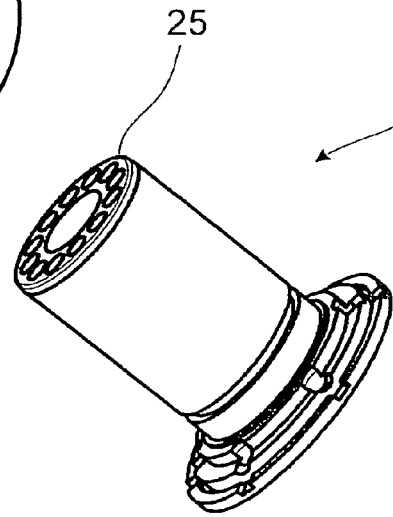
Fig. 5
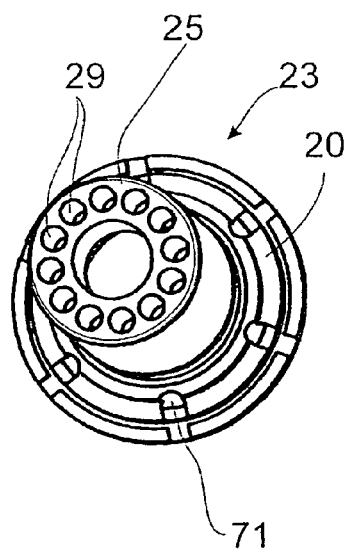
Fig. 6

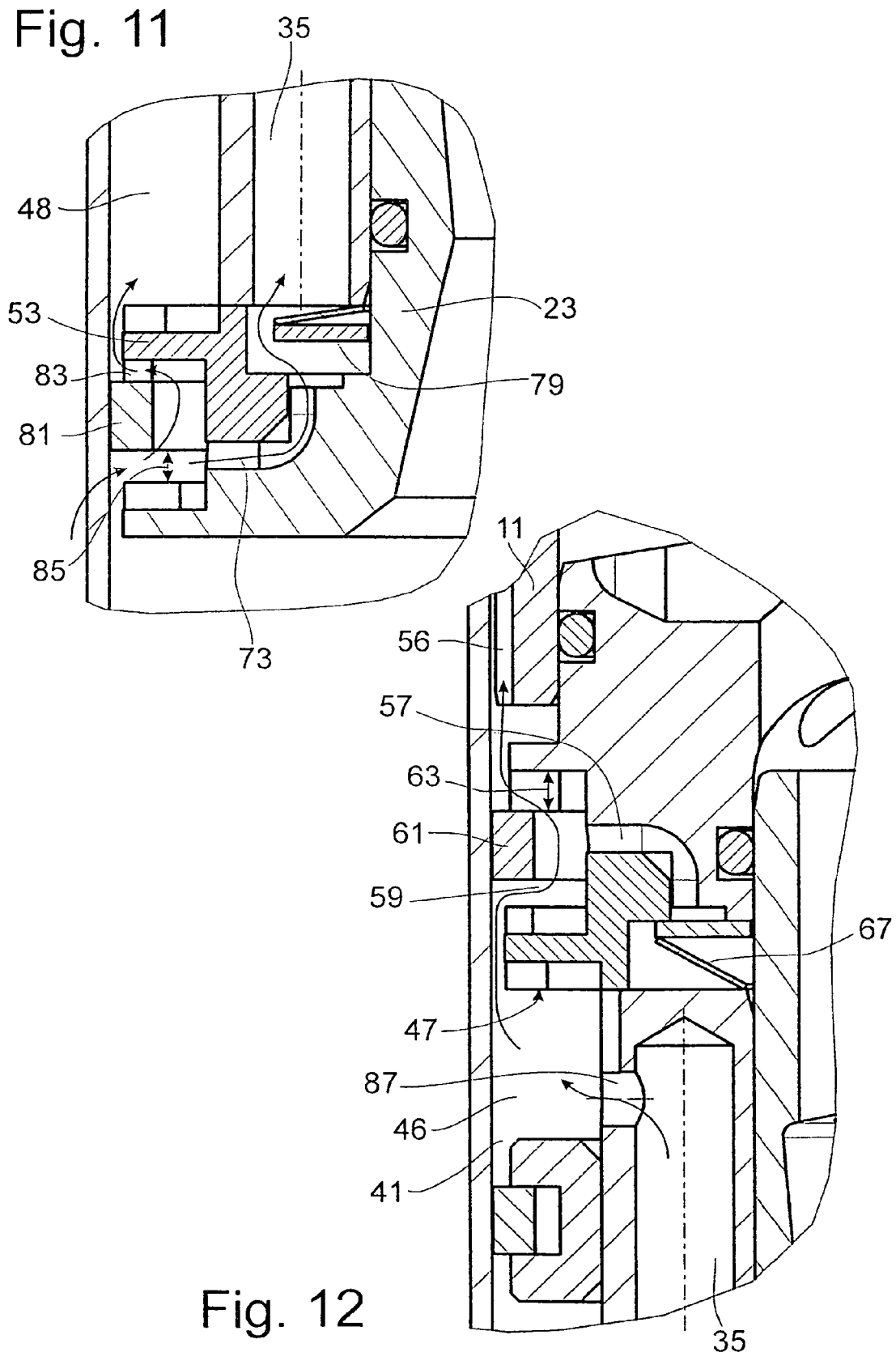

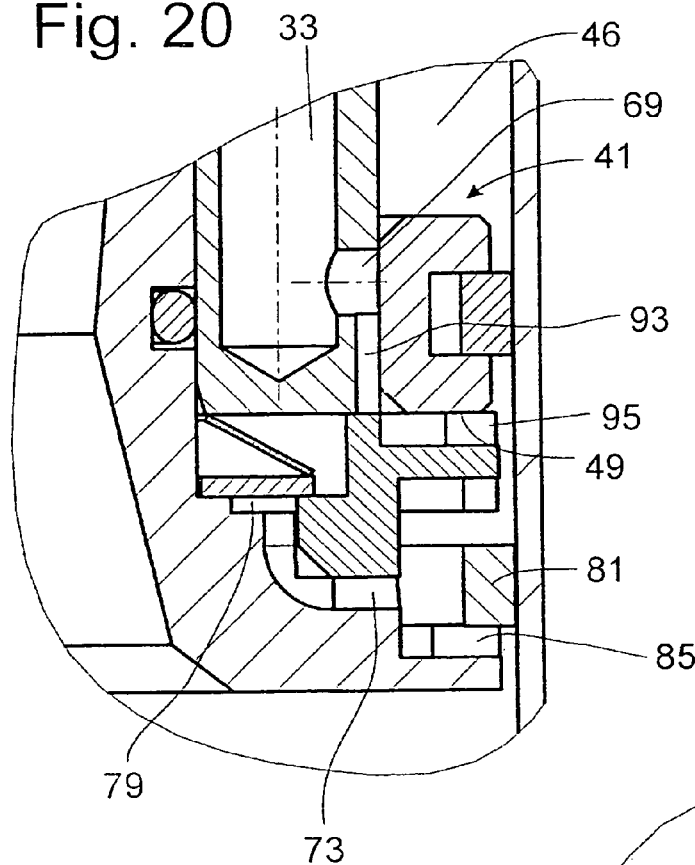
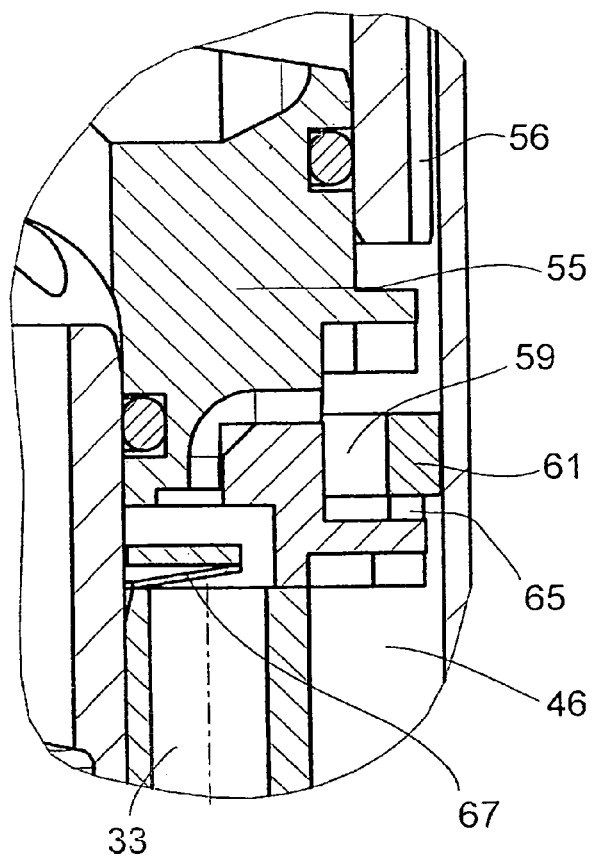

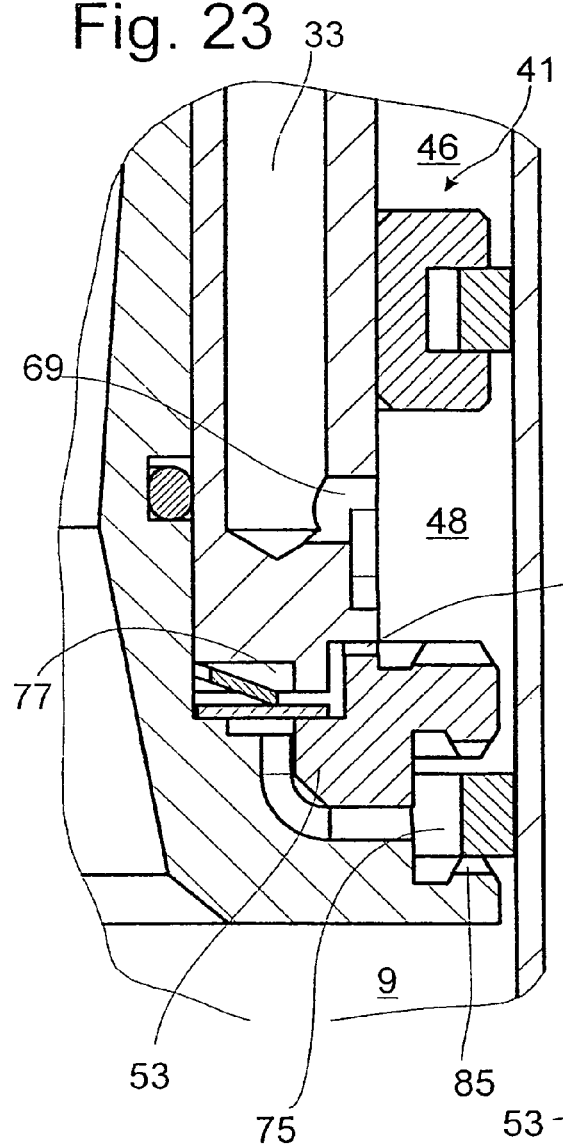
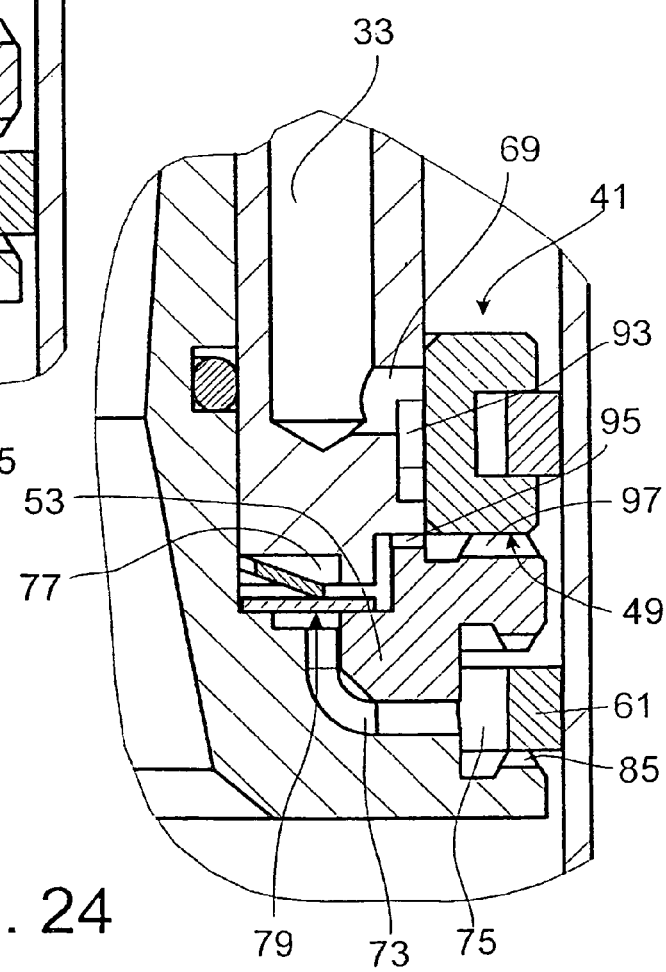

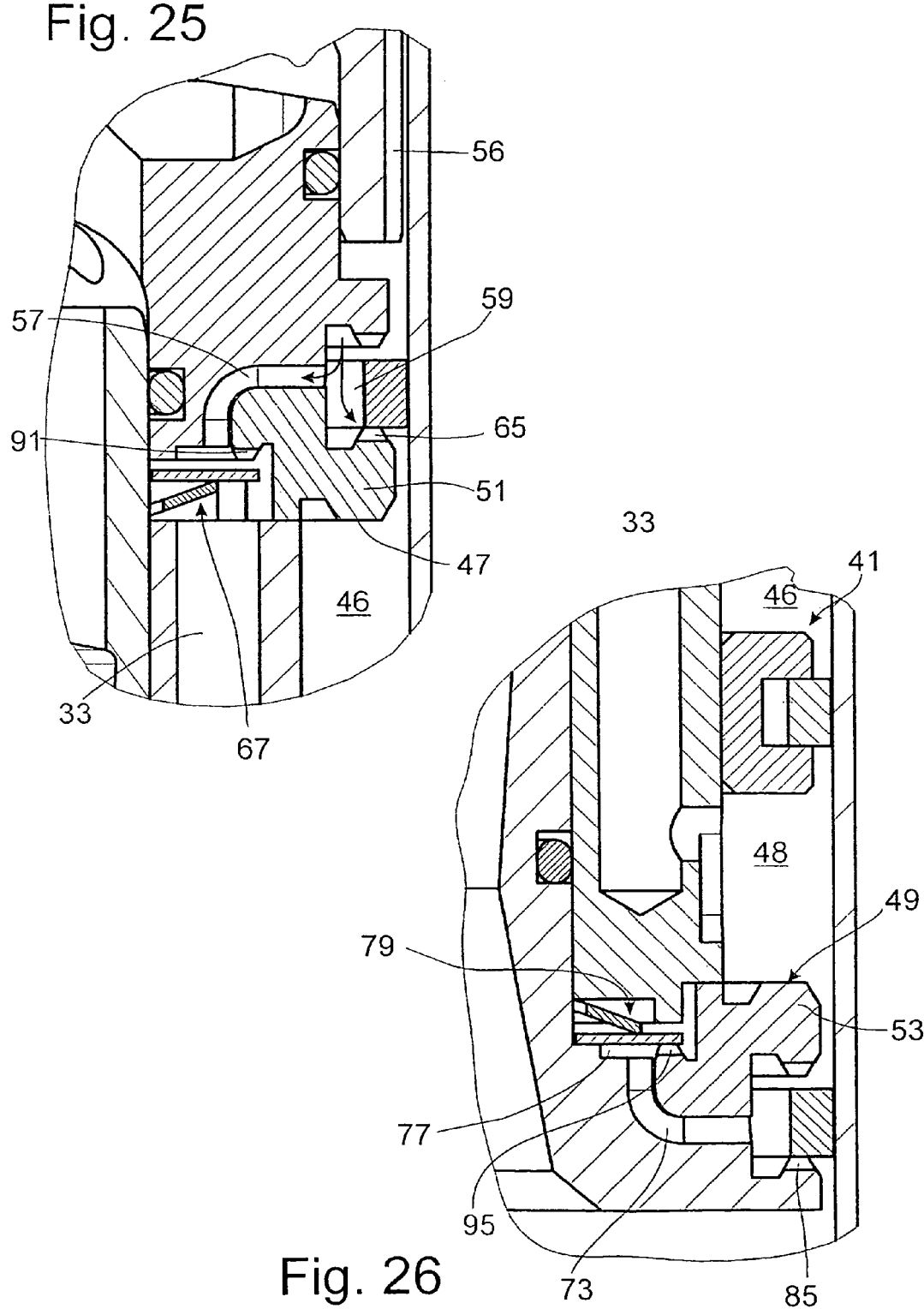

Fig. 29
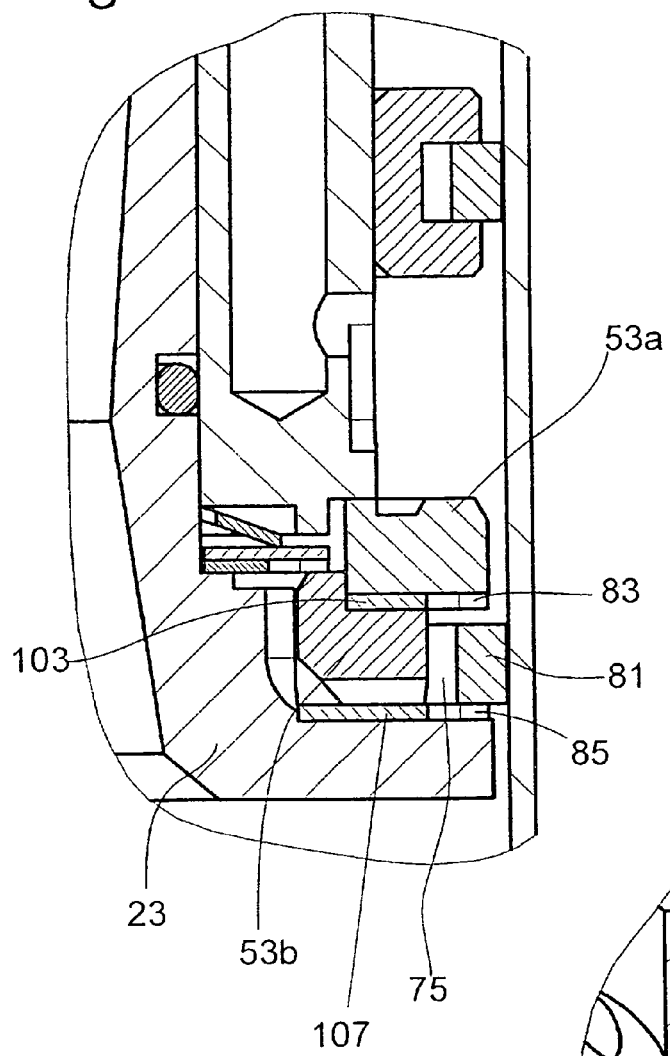
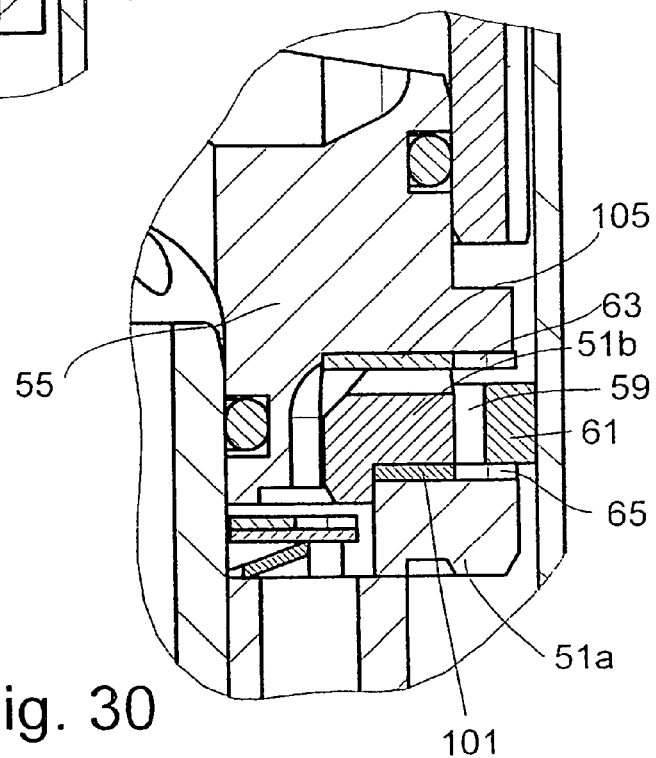
Fig. 30

VIBRATION DAMPER WITH AMPLITUDE-SELECTIVE DAMPING FORCE

BACKGROUND OF THE INVENTION

1. Field of the Invention

The invention pertains to a vibration damper with amplitude-selective damping force having a piston arranged in a cylinder and dividing the cylinder into two working spaces, the piston including a flow connection controlled by an axially movable switching ring in response to the movement of the piston rod.

2. Description of the Related Art

A vibration damper with amplitude-selective damping force is known from U.S. Pat. No. 5,823,306. This damper has a piston arrangement comprising a lower and an upper valve, which are kept a certain distance apart by a spacer. The two valves are each equipped on both sides with damping valve disks and at least one check valve disk. A switching ring with freedom of axial movement is installed between the two valves. Depending on the direction in which the piston rod is moving, the switching ring comes to rest against one or the other of the facing valve disks of the two valves and thus releases or blocks an annular gap between the valve disks and the inside wall of the cylinder.

U.S. Pat. No. 6,352,145 also describes a vibration damper with amplitude-selective damping force with a piston arrangement having an axially movable switching ring which controls a flow connection through a hollow piston rod pin. An outlet of the flow connection is provided upstream of a stop surface for the switching ring. As a result, noise problems can be partially solved. It is necessary, however, to tolerate the fact that a change in the amplitude-selective damping force is possible only in the outward-travel direction of the piston rod and that the piston rod must travel a certain "dead" distance, namely, the distance between the outlet opening and the stop surface, before an amplitude-selective change in the damping force can go into effect in the outward-travel direction.

SUMMARY OF THE INVENTION

An object of the present invention is to provide a solution for minimizing the noise of a vibration damper with amplitude-selective damping force.

The object of the present invention is accomplished by a vibration damper having a piston arranged in a cylinder and dividing the cylinder into two working spaces, the piston including a flow connection controlled by an axially movable switching ring in response to the movement of the piston rod. The piston further includes a bypass channel which is hydraulically parallel to a flow connection between the two working spaces on opposing sides of a piston. The bypass channel is provided with at least two connecting openings for the flow connection, where at least one connecting opening is situated upstream of a stop surface, and where a check valve arrangement separates the bypass channel and the flow connection from each other in the various directions of flow as a function of the movements of the piston rod, this separation being accomplished by providing the check valve arrangement with two check valves, which close in opposite directions.

The bypass channel and the connecting openings provide a pressure cushion, which prevents the switching ring from generating switching noise. So that no hydraulic short circuits occur inside the piston arrangements, and so that the technical effect of the pressure cushion is available for both directions of piston rod movement, the volume is directed by the check valve arrangement.

In a specific embodiment, the bypass channel is formed by a spacer sleeve. At least one separate bypass channel formed by a blind hole is available for each flow direction.

So that no back-pressure which could hinder the axial mobility of the switching ring can build up against the switching ring, the spacer sleeve is provided on its outside surface with a longitudinal profile, which allows the medium to flow behind the switching ring.

The bypass channels are formed by blind holes, which are connected to each other by transverse openings. As a result of this design, the medium can flow in either direction or alternately in both directions through the bypass channels, depending on the direction in which the piston rod moves and the position which the switching ring occupies.

In addition, the piston arrangement has a distributor ring with a connection to the flow connection and the bypass channel. The distributor ring is located behind a conventional damping piston.

The working surface forming one of the boundaries of the pilot opening cross section can be formed by a stop surface or by a spacer sleeve. It is also possible to select a combination design according to which, for example, the pilot opening cross section is positioned in the spacer sleeve in the immediate vicinity of a stop surface, so that, for example, a larger pilot opening cross section is present before the switching ring reaches the stop surface.

The cross section of the pilot opening for the inward travel of the piston rod can also be different from that of the pilot opening for the outward travel.

According to another embodiment, the flow connection is preceded by a pilot opening ring with an axially movable valve ring, which, as a function of its switching position, determines an inflow cross section and an adjacent cross section for the flow connection. Experiments have shown that the inflow cross section leading to the flow connection should tend to be somewhat smaller than the adjacent cross section. Otherwise, the maximum control distance determined by the stop surfaces is not fully available to the switching ring as a result of the pressure relationships. For the sake of a compact design, the pilot opening ring and the distributor ring form the boundaries of an annular space in which one of the check valves is located. The check valve is formed, for example, by a valve ring and a simple wave washer.

The pilot opening ring works together with the sleeve-shaped base carrier to form a switching ring groove for the valve ring. If the switching ring groove is divided axially into two parts, the inflow and adjacent cross sections can be very easily stamped into the components in question.

According to another embodiment, the pilot opening cross section is located outside the surfaces which form the boundaries of the annular spaces separated by the switching ring. In this embodiment, depending on the design, the pilot opening cross sections do not have to be stamped into the pilot opening rings, which eliminates the danger of distorting the rings. Even more important, however, is that the high-frequency contact of the switching ring with the stop surfaces cannot cause any change in the cross sections of the pilot openings.

The pilot opening cross section may, for example, be provided on the outflow side of at least one of the annular spaces which contains a check valve.

The pilot opening cross section could alternatively be provided between the spacer sleeve and the transverse pilot opening ring.

It is also possible for the pilot opening cross section to be a part of the check valve.

Alternatively, the pilot opening cross section may be formed by at least one pilot opening disk, which makes it possible to adjust the performance characteristics very easily.

Another measure for simplifying fabrication, especially for avoiding the need for stamping, consists in dividing the pilot opening ring axially into two parts, and by clamping a valve disk containing the inflow cross section between the two parts of the pilot opening ring.

The adjacent cross section may then be provided inside a valve disk.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIGS. 4-6 are top, side, and bottom perspective views of a sleeve-shaped base carrier of the piston arrangement of FIG. 1;

FIGS. 11-12 are detailed sectional views of the piston arrangement of FIGS. 9-10;

FIGS. 20-21 is a sectional view of a detail of the piston arrangement of FIGS. 18-19;

FIGS. 22-24 are sectional views of a pilot opening cross section between the pilot opening ring and the spacer sleeve;

FIGS. 25-27 are sectional views of a pilot opening cross section in the valve seat for the check valve;

FIGS. 29-30 are sectional views of an axially divided pilot opening ring.

DETAILED DESCRIPTION OF THE PRESENTLY PREFERRED EMBODIMENTS

Figure 1:
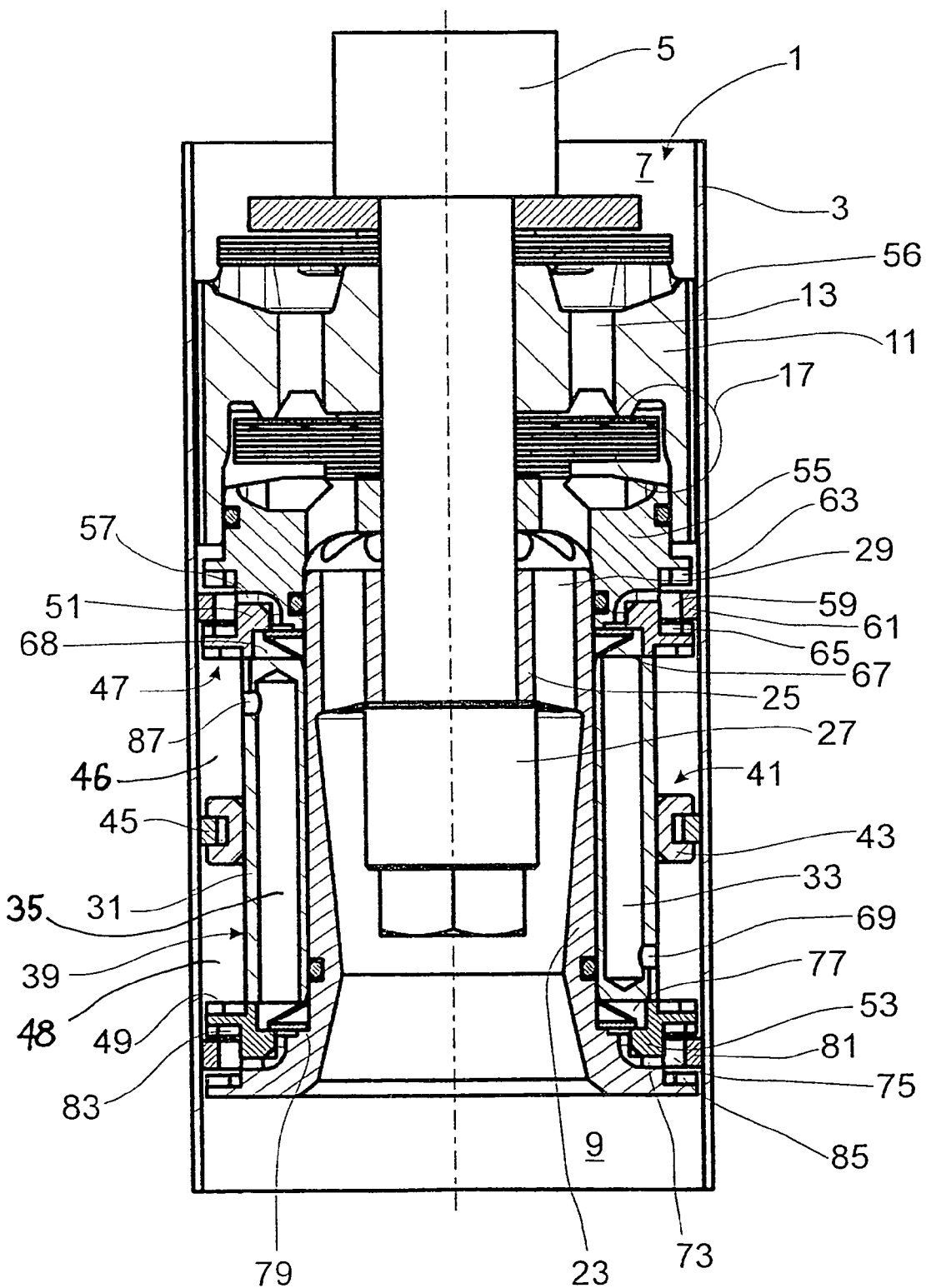
FIG. 1 is a cross-sectional view of a piston arrangement for a vibration damper according to an embodiment of the present invention.
Figure 2:
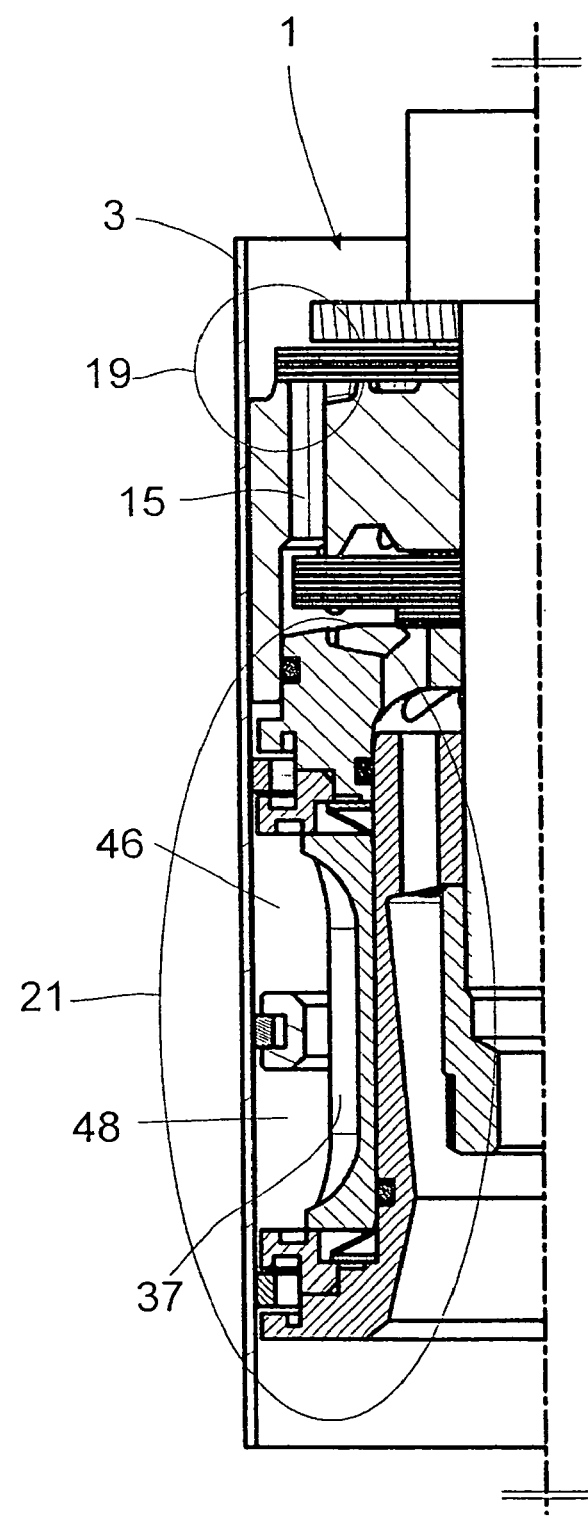
FIG. 2 is a sectional view of the left side of a piston arrangement according to FIG. 1 through a cross-sectional plane rotated to a different angle from that of FIG. 1.
Figure 3:
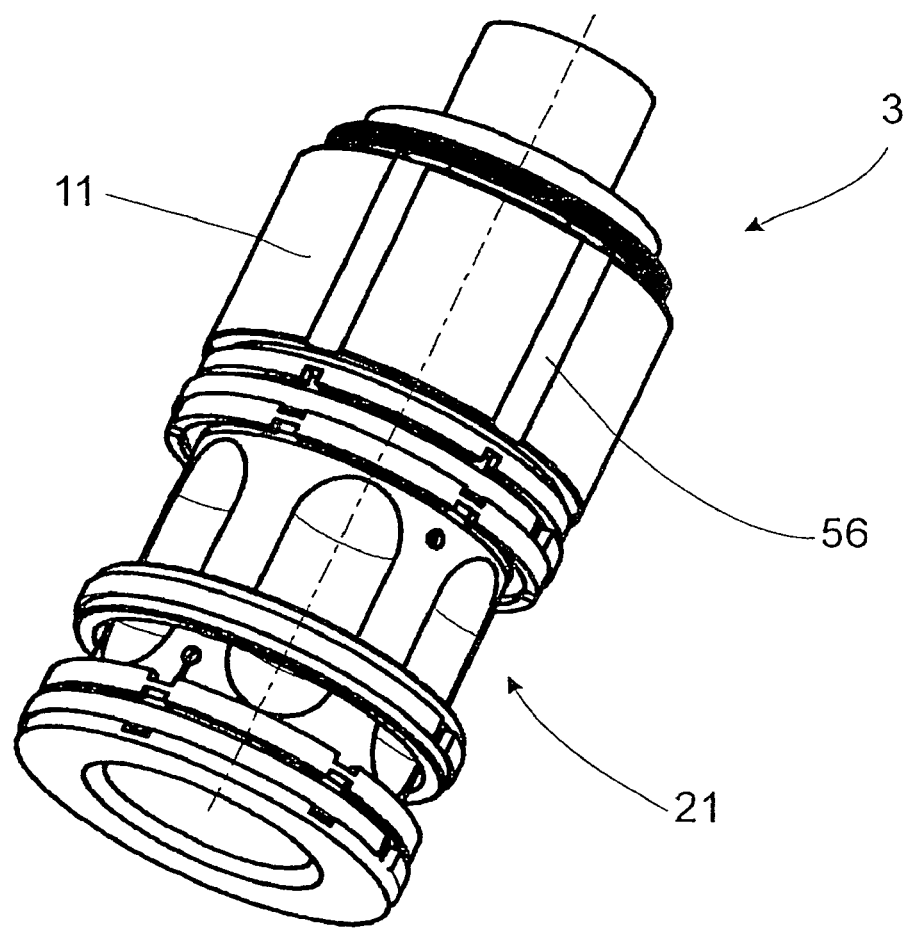
FIG. 3 is a perspective view of the piston arrangement according to FIG. 1.

FIGS. 1-3 show a piston arrangement 1 inside a damping medium-filled cylinder 3 as part of a vibration damper. It is irrelevant whether the vibration damper is of the single-tube type or of the two-tube type. The piston arrangement 1 is attached to a piston rod 5 and divides the cylinder 3 into a working space 7 on the side of the piston arrangement facing the piston rod 5 and a working space 9 on the side of the piston arrangement facing away from the piston rod 5.

The piston arrangement includes a piston 11 with through-channels 13, 15 is equipped with valve disks associated with damping valves 17, 19 for damping the flow of damping medium for both directions of flow through the piston 11. An assembly 21 (see FIG. 2) with a sleeve-shaped base carrier 23 is supported radially and axially on the piston 11. A bottom 25 of the base carrier 23 is clamped axially by a piston nut 27.

Figure 7:
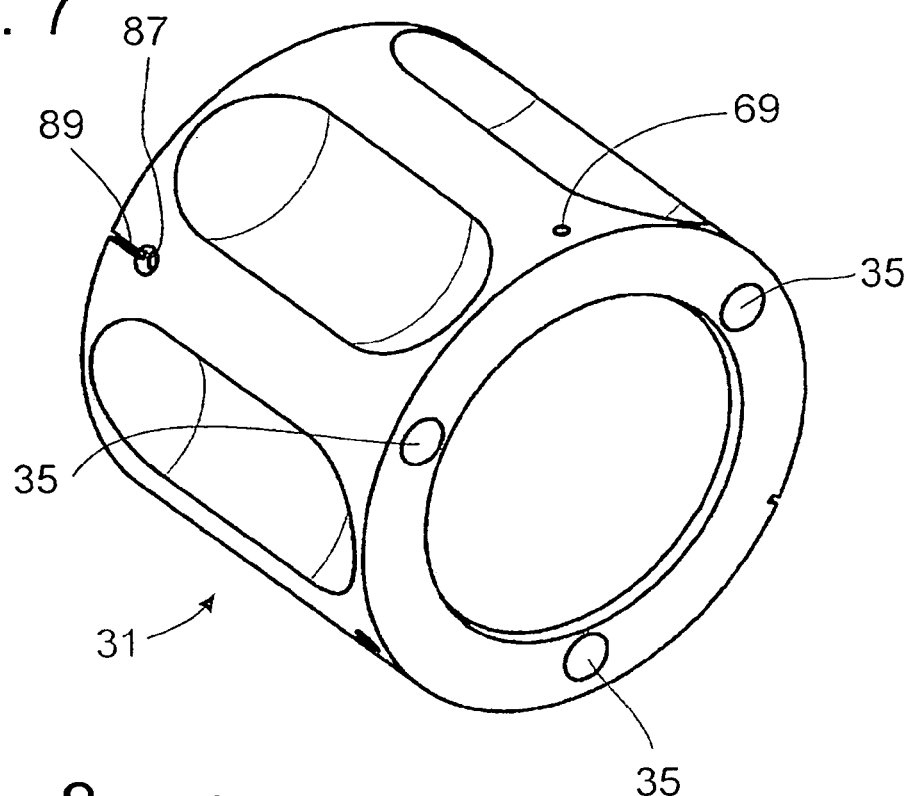
FIGS. 7-8 are bottom and top perspective views of the spacer sleeve of the piston arrangement of FIG. 1.
Figure 8:
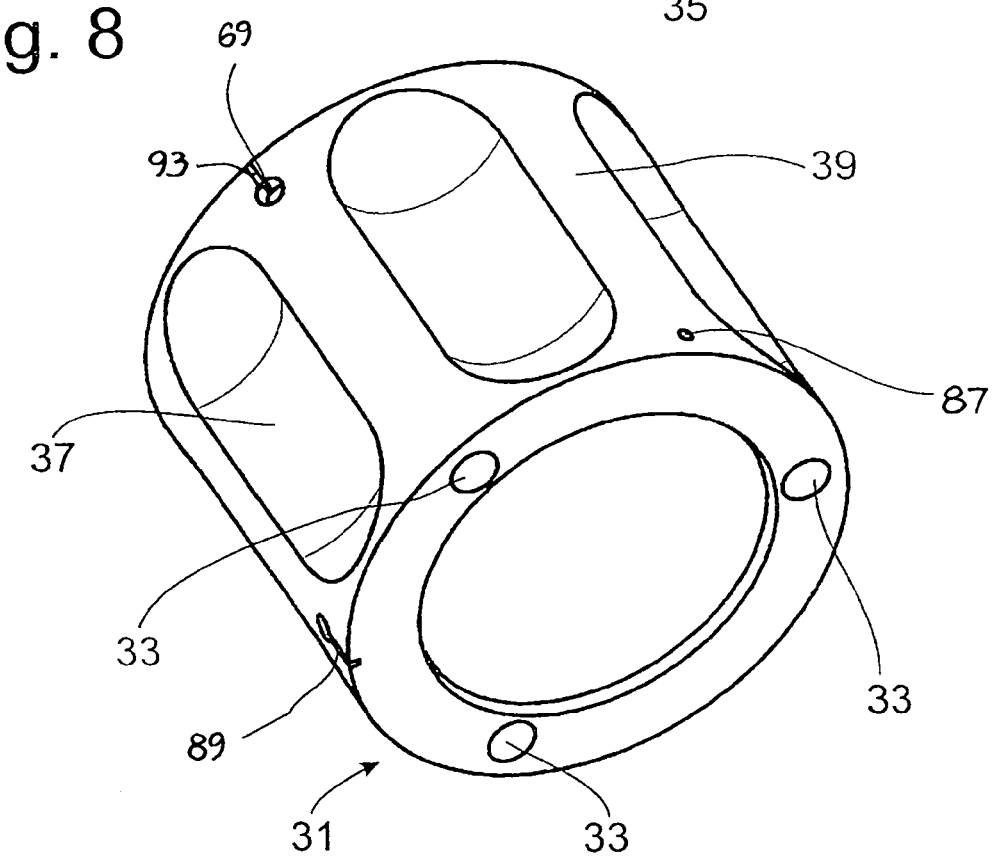
Figure 9:
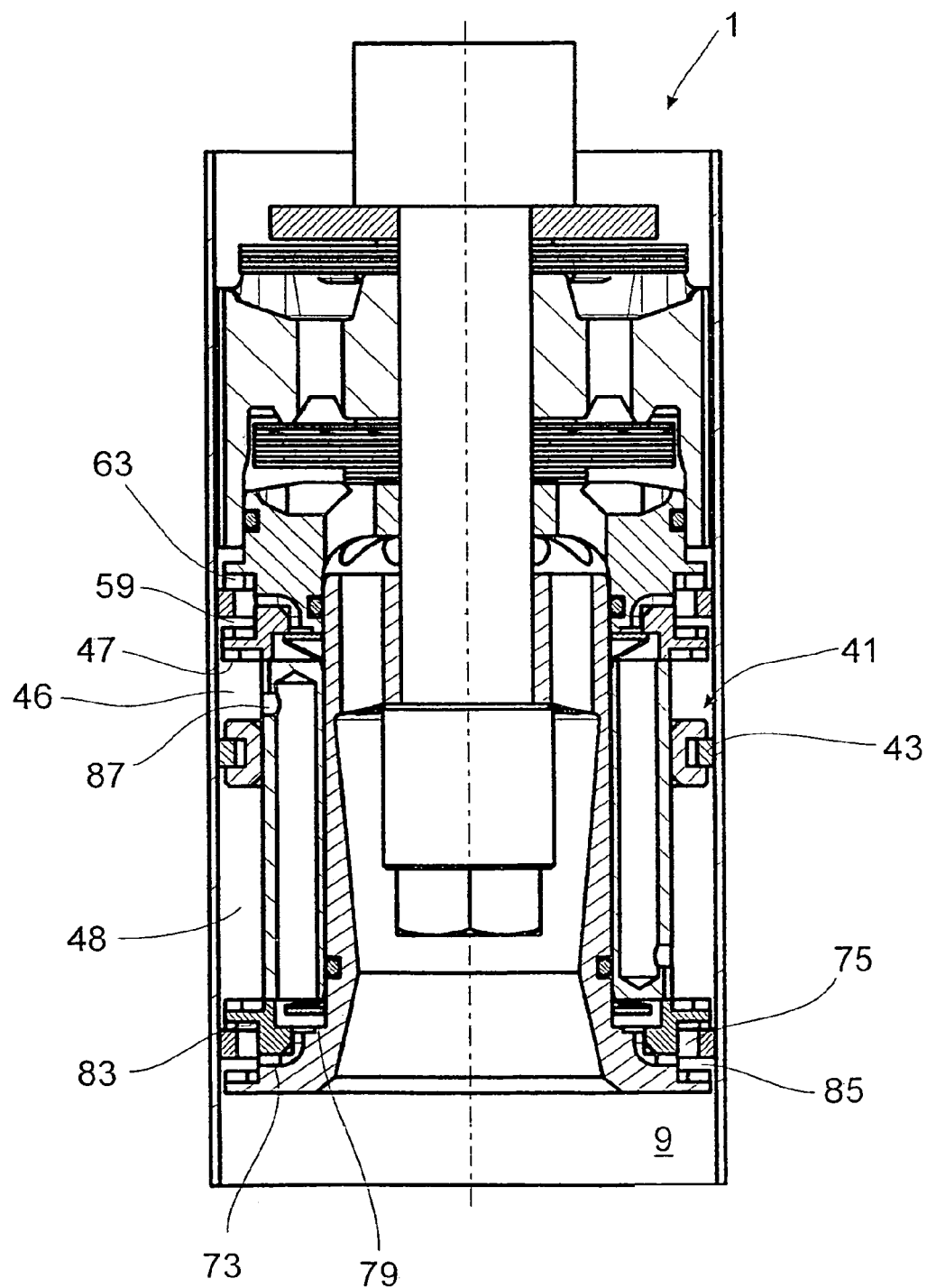
FIGS. 9-10 are cross sectional views through the piston arrangement corresponding to FIGS. 1 and 2 in the inward-travel direction with weak damping force.
Figure 10:
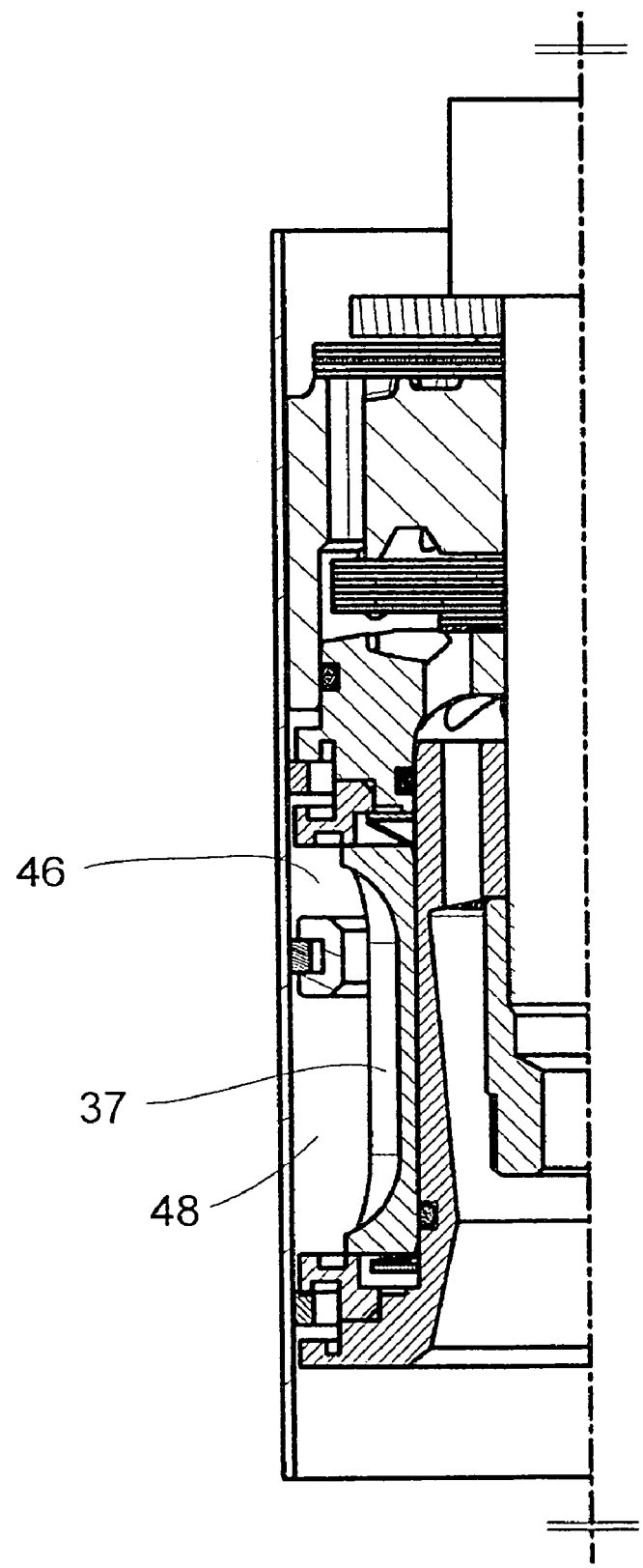

FIGS. 4-6 show the sleeve-shaped base carrier 23 as an isolated part. The bottom part 25 has several axial through-openings 29 which allow damping medium to be exchanged via the damping valves 17, 19 of the piston 11. At the other end of the base carrier 23 is a multi-stepped flange 20 which carries a spacer sleeve 31, as shown in FIGS. 1 and 2. The spacer sleeve 31 is shown as an isolated part in FIGS. 7 and 8. The spacer sleeve 31 has several blind holes 33, 35, arranged in alternation on a reference circle, and a longitudinal profile in the form of connecting channels 37 extending in the axial direction. On the lateral surface 39 of the spacer sleeve 31, a switching ring 41 (see FIG. 1) is supported with freedom of axial movement. This switching ring 41 includes a guide ring 43 and a throttle ring 45. The throttle ring 45 may also be designed as a sealing ring. The path of axial travel of the throttle ring 45 is limited by two stop surfaces 47, 49, which are realized as mirror images of each other on pilot opening rings 51, 53. The spacer sleeve 31 and the inside walls of the cylinder 3 form the boundaries of two annular spaces 46, 48, the sizes of which change in opposite directions as a function of the position of the switching ring 41. A distributor ring 55, which centers the sleeve-shaped base carrier 23 and the pilot opening ring 51, is located axially between the piston 11 and the pilot opening ring 51.

FIGS. 1 and 3 show a flow connection 56, which may, for example, be effected by axial grooves in the piston 11. The annular spaces 46, 48 together with the connecting channels 37 represent an extension of the flow connection 56 in the piston 11. The damping medium can flow toward the distributor ring 55 in a manner hydraulically parallel to the through channels 13, 15 of the piston 11. The distributor ring 55 has pockets extending in the radial direction. The pilot opening ring 51 and the pockets of the distributor ring define the boundaries of a connection 57 between the flow connection 56 and the blind holes 33, 35 of the spacer sleeve 31. In addition, the pilot opening ring 51 and the distributor ring 55 define a switching ring groove 59, in which an axially movable valve ring 61 is captured. The switching ring groove 59 and lateral groove surfaces of the valve ring 61 define an inflow cross section 63 leading to an adjacent cross section 65 and to the annular space 46 for connecting the working space 7 to the annular space.

A first check valve 67 is installed hydraulically parallel to the valve ring 61 in an annular space 68, bounded by the pilot opening ring 51 and the distributor ring 55. The check valve 67 opens in the flow direction into the blind hole 33. Each of the blind holes 33 has a transverse opening 69 leading to the annular space 48, so that the blind holes 33 of the spacer sleeve 31 form a bypass channel leading from the flow connection 56 to the annular spaces 46, 48.

The pilot opening ring 53 is also supported on the flange 20 of the sleeve-shaped base carrier 23. The pilot opening ring 53 cooperates with pockets 71 (FIG. 6) in the sleeve-shaped base carrier 23 to form connections 73 and a switching ring groove 75. In an annular space 77, bounded by the pilot opening ring 53 and the base carrier 23, a second check valve 79 determines the inflow from the working space 9 via the switching ring groove 75 into the blind holes 35. In the switching ring groove 75, an axially movable valve ring 81 also defines an inflow cross section 83 and an adjacent cross section 85. The blind holes 35 also have transverse openings 87 leading to the annular space 46. Thus the blind holes 35 also represent a bypass channel leading to the switching ring 41 when the medium flows toward the piston arrangement 1 from the working space 9.

FIGS. 1 and 3 show the piston arrangement 1 with the switching ring 41 in a certain operating position in which it generates a comparatively weak damping force by way of the inflow cross sections 63 and 83. When the piston rod 5 travels inward toward the working space 9, the switching ring 41 with its throttle ring 45, which is pretensioned radially against the cylinder 3, executes relative movement toward the stop surface 47. The damping medium can flow from the working space 9 via the switching ring groove 75 and the large adjacent cross section 85, through the connections 73 and the open check valve 79, and into the blind holes 35. The transverse openings 87 allow the medium to escape along the switching ring groove 59 and the adjacent cross section 63 into the flow connection 56. As can be seen in the detailed views of FIGS. 11 and 12, the adjacent cross section 85 is larger than the inflow cross section 83, so that the switching ring is subjected to a certain pressure gradient by the flow, whereas at the same time a sufficient supply of damping medium to the annular space 46 in ensured, so that the switching ring can slide toward the stop surface 47 under a slight braking action.

Simultaneously, damping medium can flow through the switching ring groove 85 and the inflow cross section 83 into the annular space 48. The two annular spaces 46, 48 are connected by the connecting channels 37 in the longitudinal profile of the spacer sleeve 31.

Figure 13:
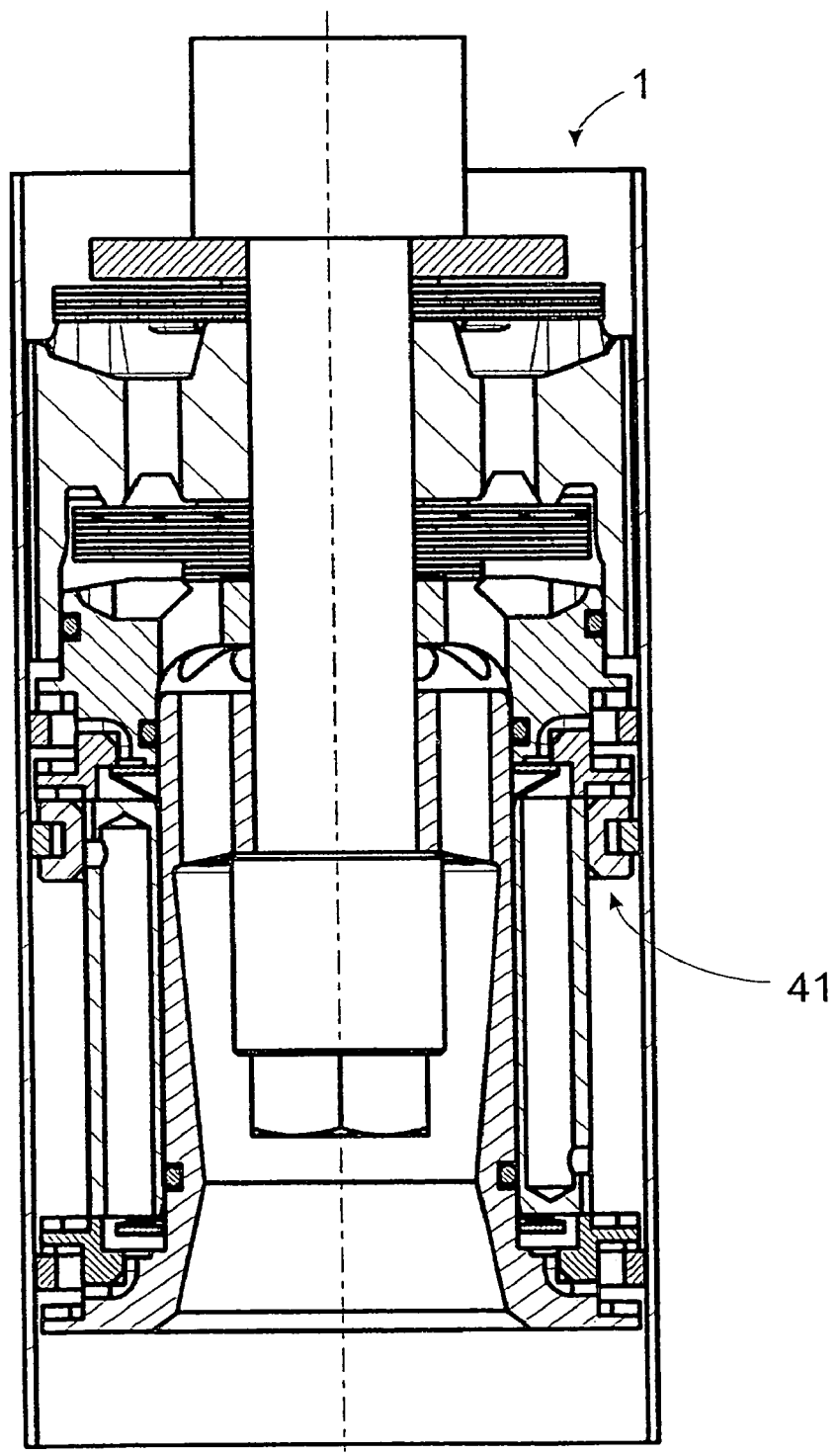
FIGS. 13-14 are cross-sectional views through the piston arrangement corresponding to FIGS. 1 and 2 in the inward-travel direction with stronger damping force.
Figure 14:
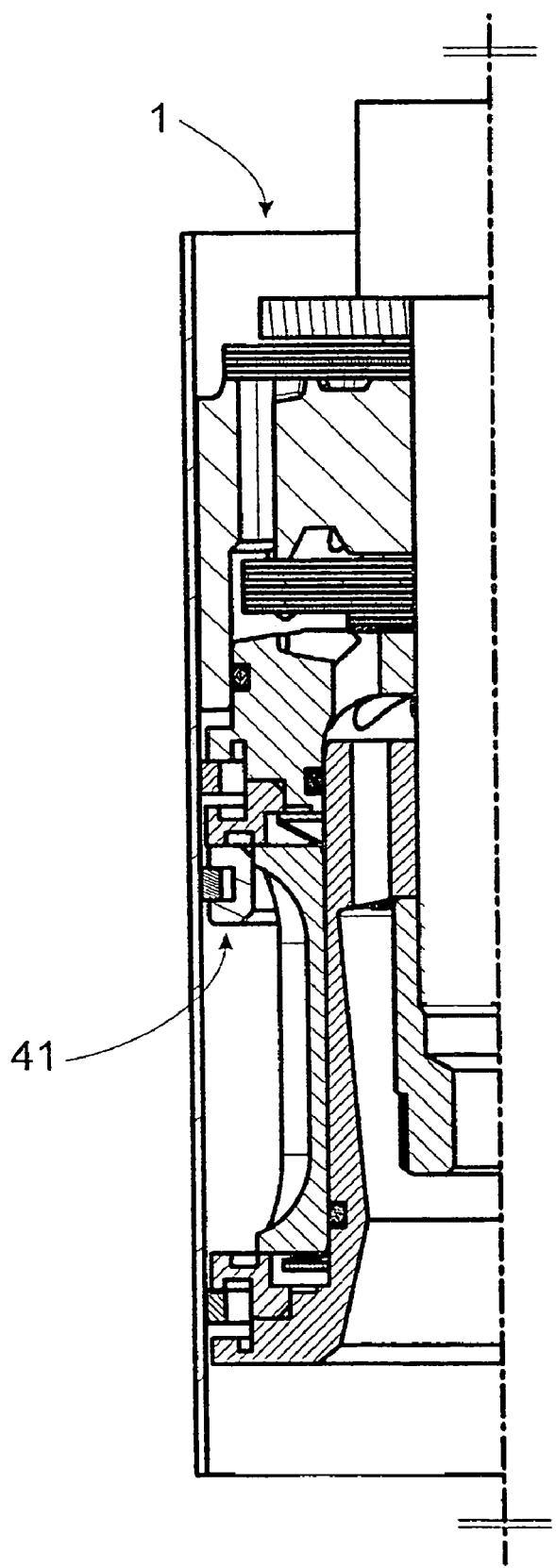
Figure 15:
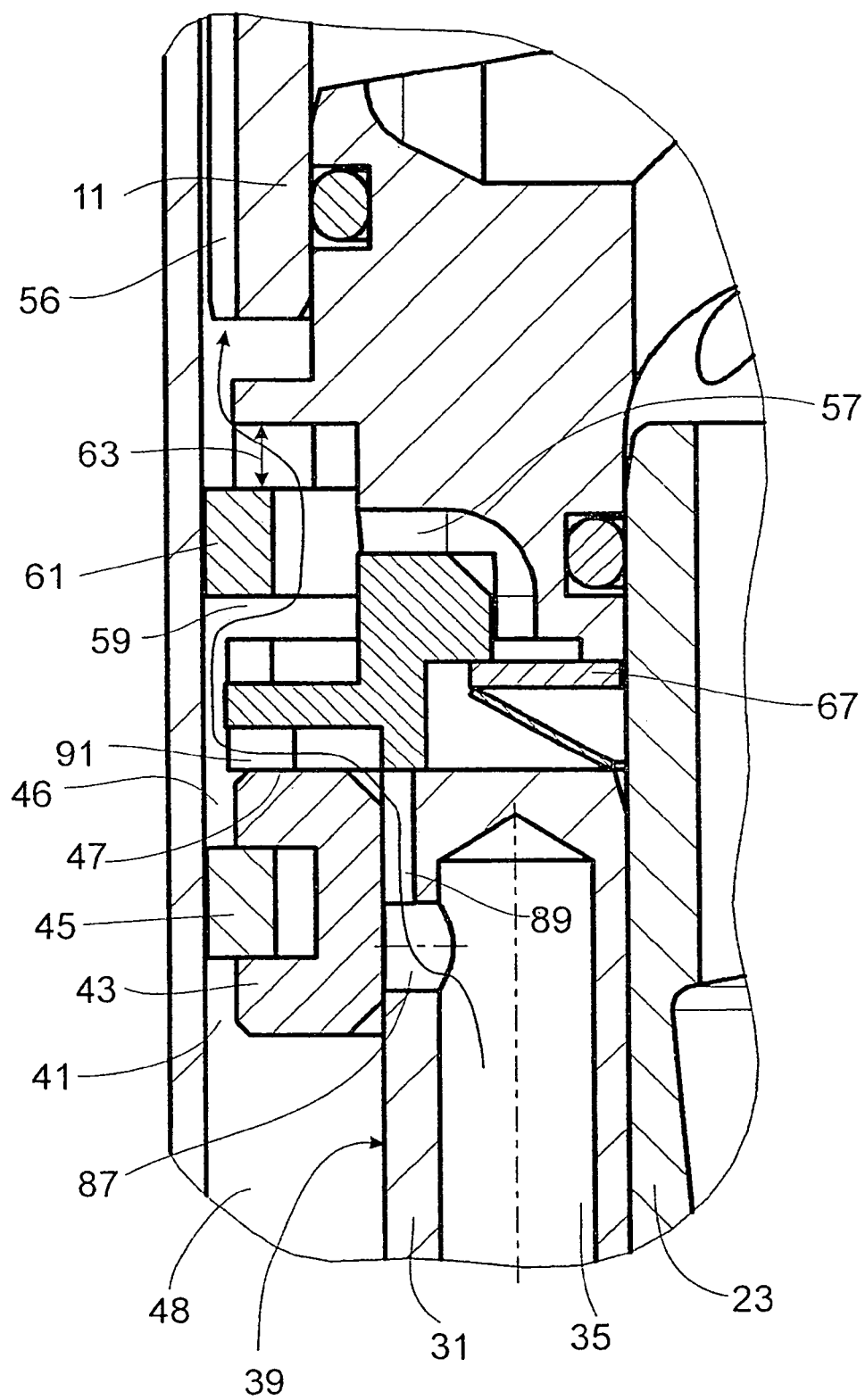
FIG. 15 is a sectional view of a detail of the piston arrangement of FIGS. 13-14.

In the event of considerable inward travel by the piston rod 5 or a wide amplitude of piston rod movement, the switching ring 41 inside the piston arrangement 1 assumes the position shown in FIGS. 13 and 14. The check valve 79 continues to occupy the operating position at the pilot opening ring 53 according to FIG. 11, so that the damping medium can flow into the bypass channel of the blind holes 35. FIG. 15 shows the position of the switching ring 41 in the condition of FIGS. 13 and 14 in detail in which the switching ring 41 rests against the stop surface 47. The transverse opening 87 is now covered by the guide ring 43, but it is not sealed off hermetically in the direction toward the annular space 46. The damping medium flows from the bypass channel of the blind holes 35 through the transverse openings 87 into axial troughs 89, which open out at the stop surface 47, which has at least one radial notch serving as a pilot opening cross section 91. The pilot opening cross section 91 allows further flow in the direction toward the switching ring groove 59.

At appropriate pressures in the blind holes 35, the damping medium can also flow between the guide ring 43 and the lateral surface 39 of the spacer sleeve 31 into the annular space 46. This annular space 46 is also connected by the transverse openings 69 (FIG. 1) to the blind holes 33. A hydraulic short-circuit in the direction toward the connection 57, however, is prevented by the closed check valve 67. When the switching ring 41 is resting against the stop surface 47 and a defined inward travel velocity of the piston is exceeded, the damping valve 19 (FIG. 2) on the piston 11 also opens.

Figure 16:
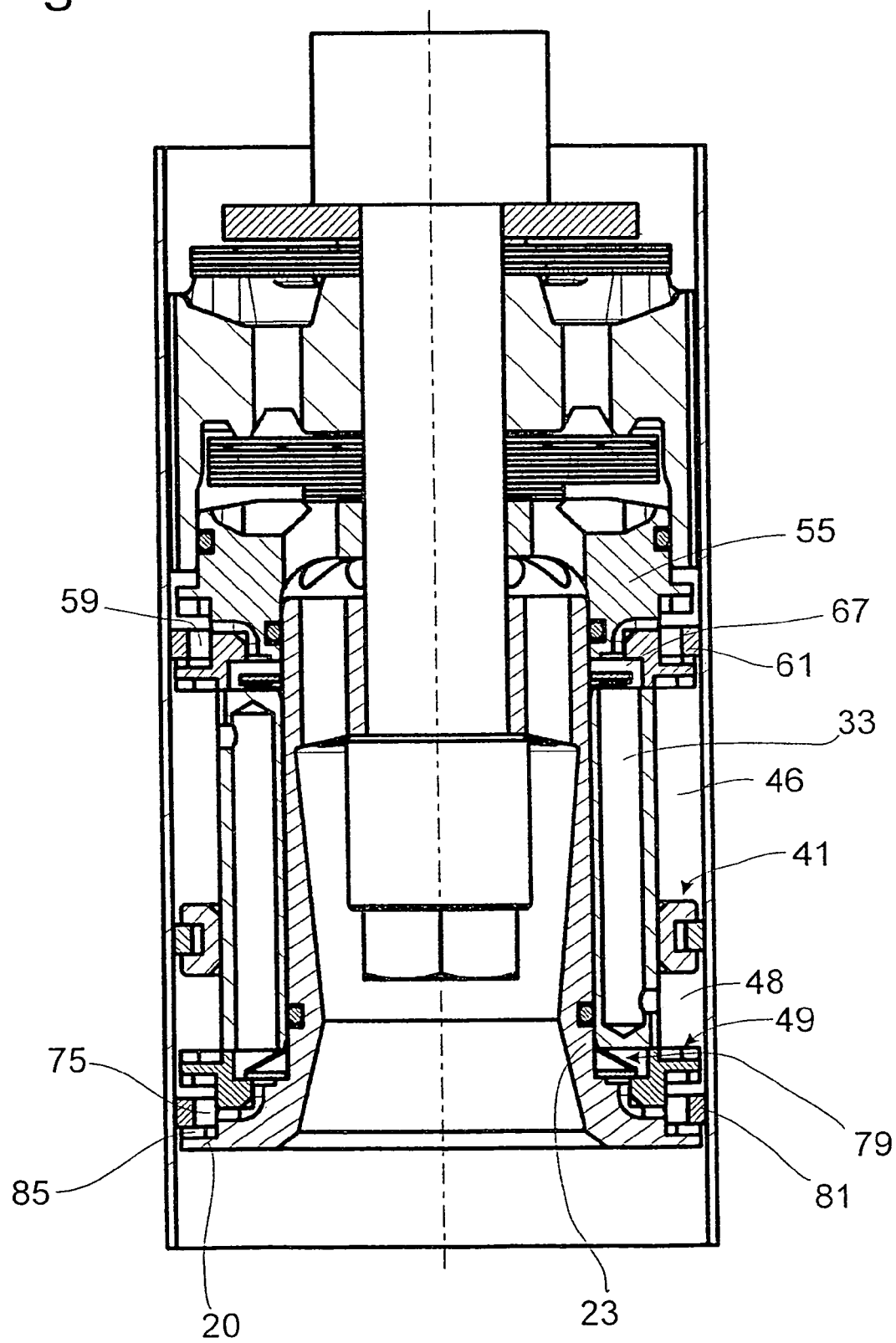
FIGS. 16-17 are cross sectional views through the piston arrangement corresponding to FIGS. 1 and 2 in the outward-travel direction with weak damping force.
Figure 17:
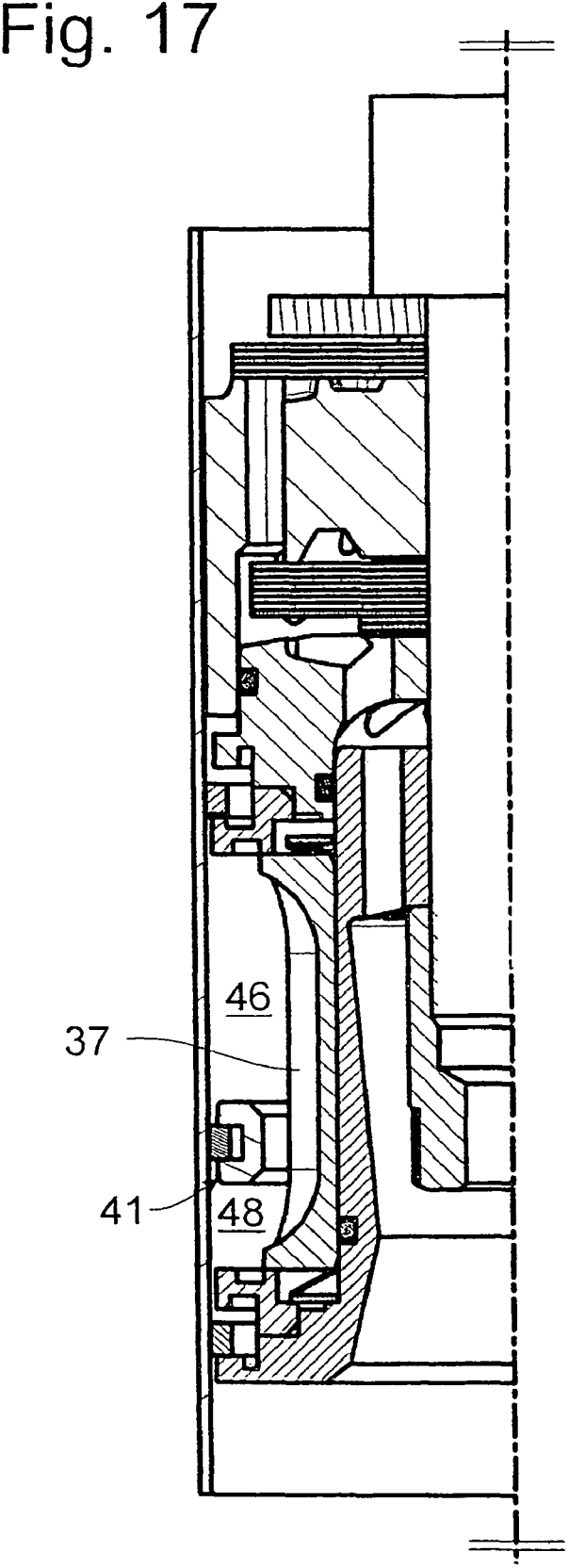

FIGS. 16 and 17 show the piston arrangement in an operating position during an outward travel phase of the piston rod, before the switching ring 41 has arrived at the stop surface 49. FIG. 21 shows that the check valve 67 is open in this operating condition so that damping medium can flow from the flow connection 56, through the distributor ring 55, and into the blind holes 33. At the same time, the check valve 79 is closed. The valve rings 61, 81 in the switching ring grooves 59, 75 have also shifted toward the lower working space. The pilot opening cross section present at the moment in question is determined by the adjacent cross section 85 in the flange 20 of the sleeve-shaped base carrier 23.

Figure 18:
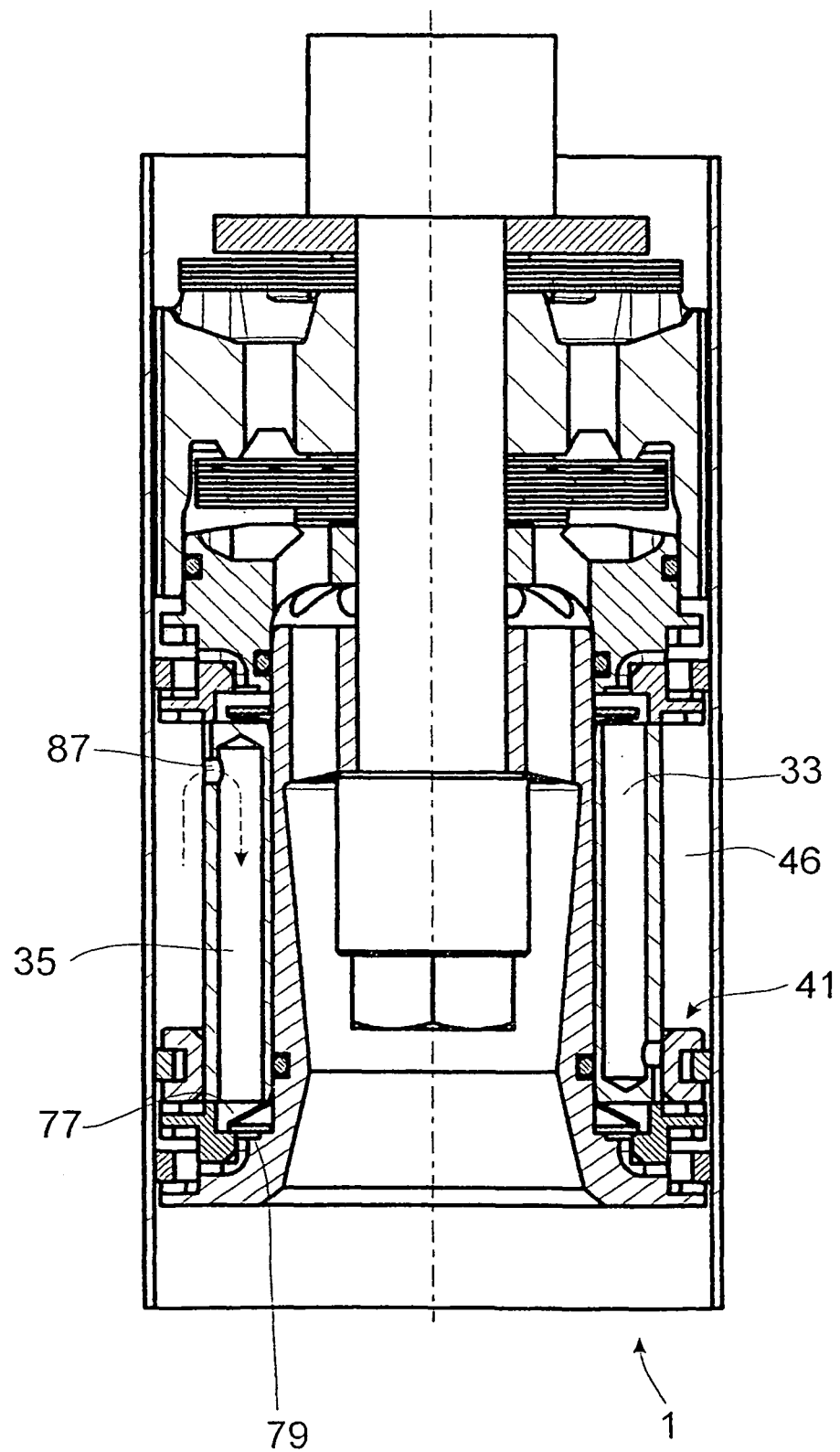
FIGS. 18-19 are cross sectional views through the piston arrangement corresponding to FIGS. 1 and 2 in the outward-travel direction with stronger damping force.
Figure 19:
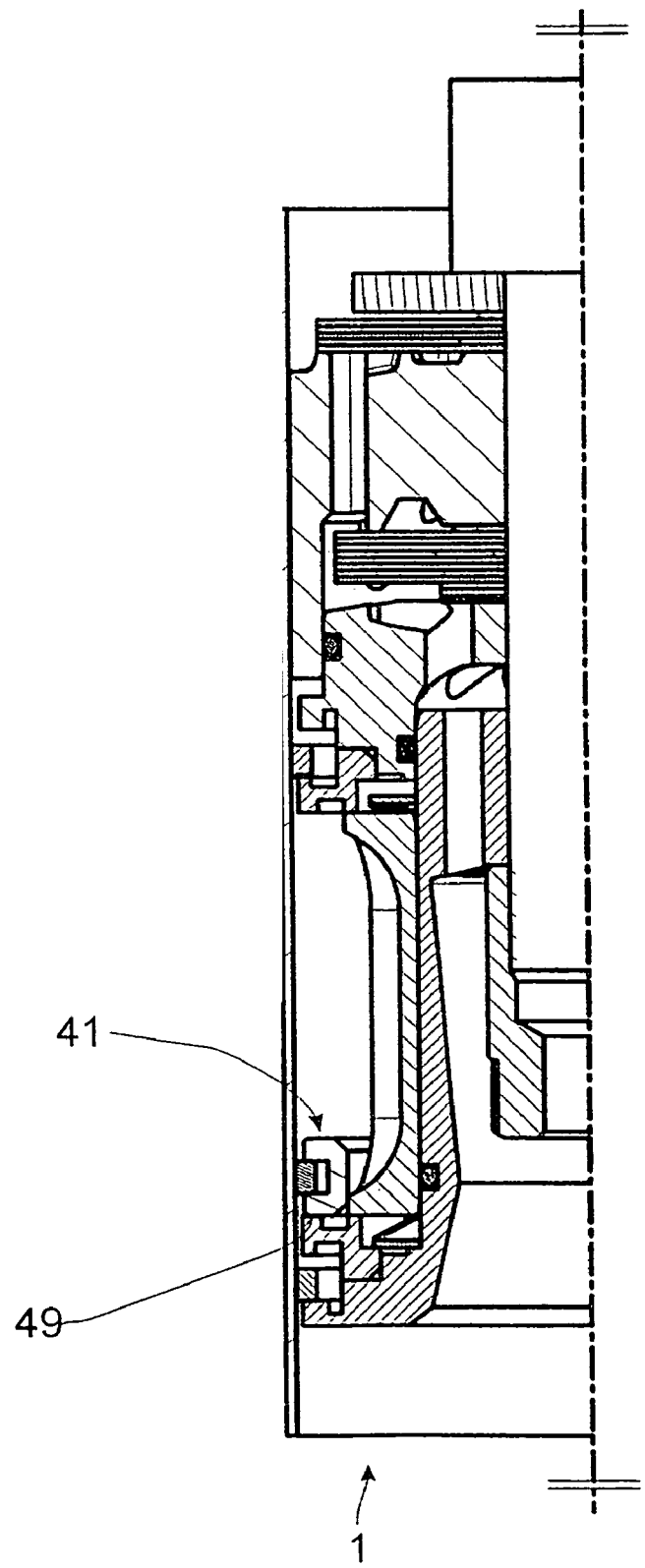

In FIGS. 18 and 19, the switching ring 41 is resting inside the piston arrangement 1 against the stop surface 49, as shown on a larger scale in FIG. 20. The damping medium flows out of the blind holes 33 through the transverse openings 69, and into the axial troughs 93, which are connected in turn to at least one pilot opening cross section 95 in the stop surface 49. The minimum of one pilot opening cross section 95 determines the damping force which exists at the moment in question, because the cross section of the transverse openings 69, of the axial troughs 93, and of the adjacent cross sections 85 are considerably larger. It should also be mentioned that the pilot opening cross section 95 for the outward travel of the piston rod should usually be made smaller than the pilot opening cross section 91 for the damping of the inward travel of the piston rod.

The valve ring 61 in the switching ring groove 59 limits the inflow cross section, and the check valve 67 continues to be open. So that no hydraulic short-circuit can occur between the blind holes 33, 35 and the annular space 46 via the transverse opening 87 for this flow-through direction in the piston arrangement (see the flow arrows in FIG. 18), the check valve 79 closes the outlet of the blind holes 35 in the direction leading toward the connection 73.

In correspondence with what has already been said concerning the inward travel of the piston rod 5, the opened damping valve 17 (FIG. 1) is available for the exchange of damping medium between the working spaces 9 and 7 at an appropriate outward travel velocity of the piston rod 5.

Figure 22:
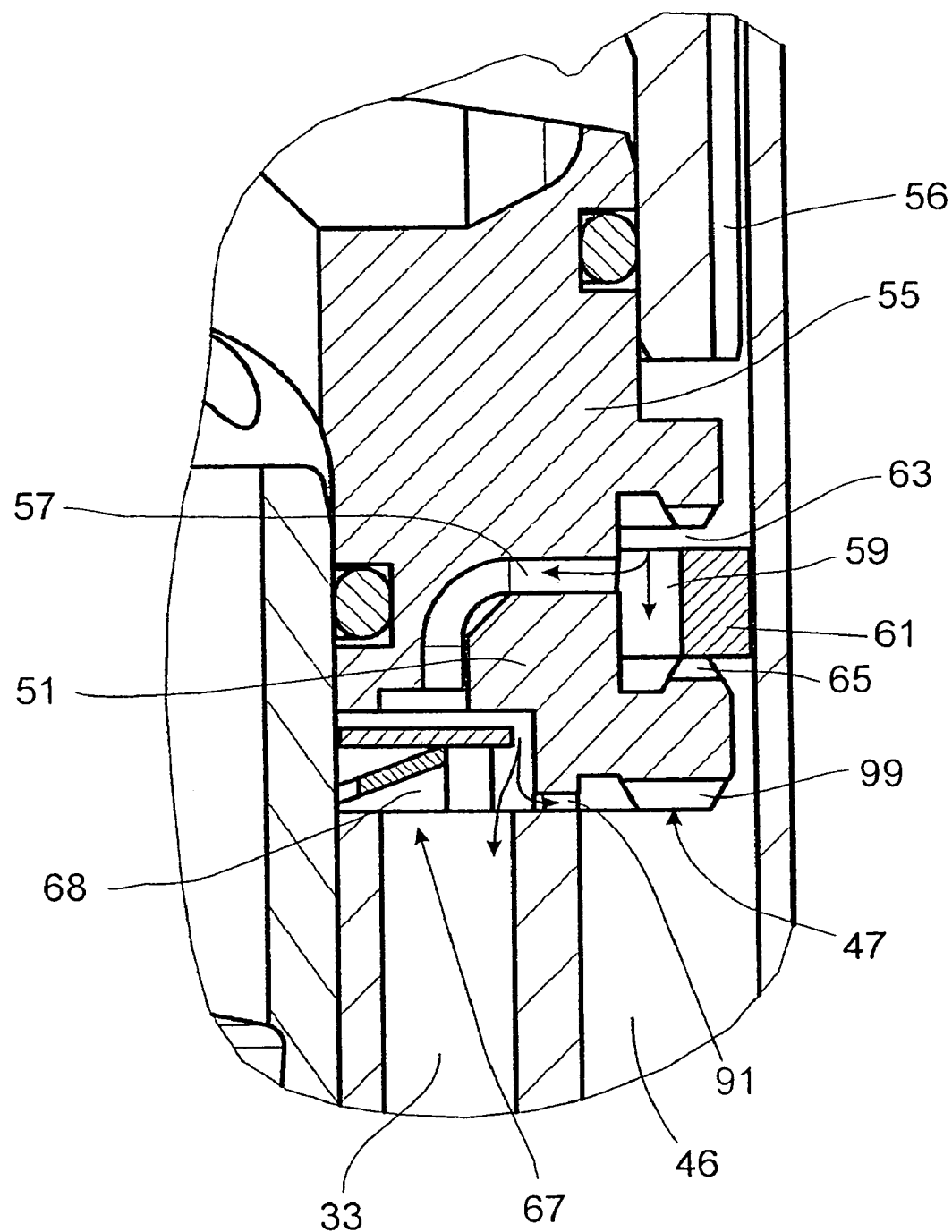

FIGS. 22-24 illustrate a further embodiments of the piston arrangement 1, in which the pilot opening cross sections 91, 95 are located outside the surfaces, e.g., the stop surfaces, 47, 49 and the lateral surface of the spacer sleeve 31, which form the boundaries of the annular spaces 46, 48 separated by the switching ring 41. Thus the pilot opening cross sections on the outflow side can be provided in at least one of the annular spaces 68, 77 for the check valves 67, 79. In a first embodiment, the pilot opening cross sections 91, 95 are determined by an end surface located between the spacer sleeve 31 and a pilot opening ring 51, 53. As a result, as can be seen in FIG. 22, two partial streams are created, which enter the switching ring groove 59 via the adjacent cross section 63. A first partial stream flows through the connection 57 and arrives in the annular space 68, in which the check valve 67 assumes a let-through position. This partial stream branches into a main stream which flows into the blind holes 33 and a secondary stream which passes through the pilot opening cross section 91 for the inward travel of the piston rod and thence into the annular space 46. The second partial stream passes through the inflow cross section 65 and thence into the annular space 46.

FIG. 23 depicts the weak damping force setting in the outward-travel direction of the piston rod in which the switching ring 41 is located upstream of the transverse opening 69. The main stream from the blind hole 33 can take the direct path via the transverse opening 69 into the switching ring groove 75. It is also possible for the damping medium to flow out from the annular space 46 through the transverse opening 87 (see FIG. 18) into the blind holes 35 and thus arrive in the annular space 77 between the pilot opening ring 53 and the spacer sleeve 31. The other flow route from the annular space 77 leads through the pilot opening cross section 95 to the lower annular space 48 and onward to the switching ring groove 75.

The second partial stream proceeding from the switching ring groove 59 can flow through the annular space 46 behind the switching ring 41, take advantage of the longitudinal profile 37 on the spacer sleeve 31 (see FIG. 17) and thus arrive in the annular space 48. All of the partial streams pass through the adjacent cross section 85 in the direction toward the working space 9.

In FIG. 24, the switching ring 41 is resting against the stop surface 49, so that the transverse opening 69 and the axial trough 93 are closed. Thus, the main stream from the blind holes 33 is blocked. The longitudinal profile 37 of the spacer sleeve 31 is also ineffective in this position of the switching ring 41. Only the damping medium volume which flows from the annular space 46 via the transverse opening 87 into the blind holes 35 and collects in the annular space 77 can emerge via the pilot opening cross section 95, through a groove 97 formed in the adjacent surface 49 of the pilot opening ring 53. A functionally equivalent groove 99 (see FIG. 22) is present in the stop surface 47 for controlling the damping force in the inward-travel direction of the piston rod. The groove 97 has a much larger cross section than the pilot opening cross section 95 in the pilot opening ring 53, so that the pilot opening cross section 95 and not the groove 97 determines the damping force of the piston arrangement.

Figure 27:
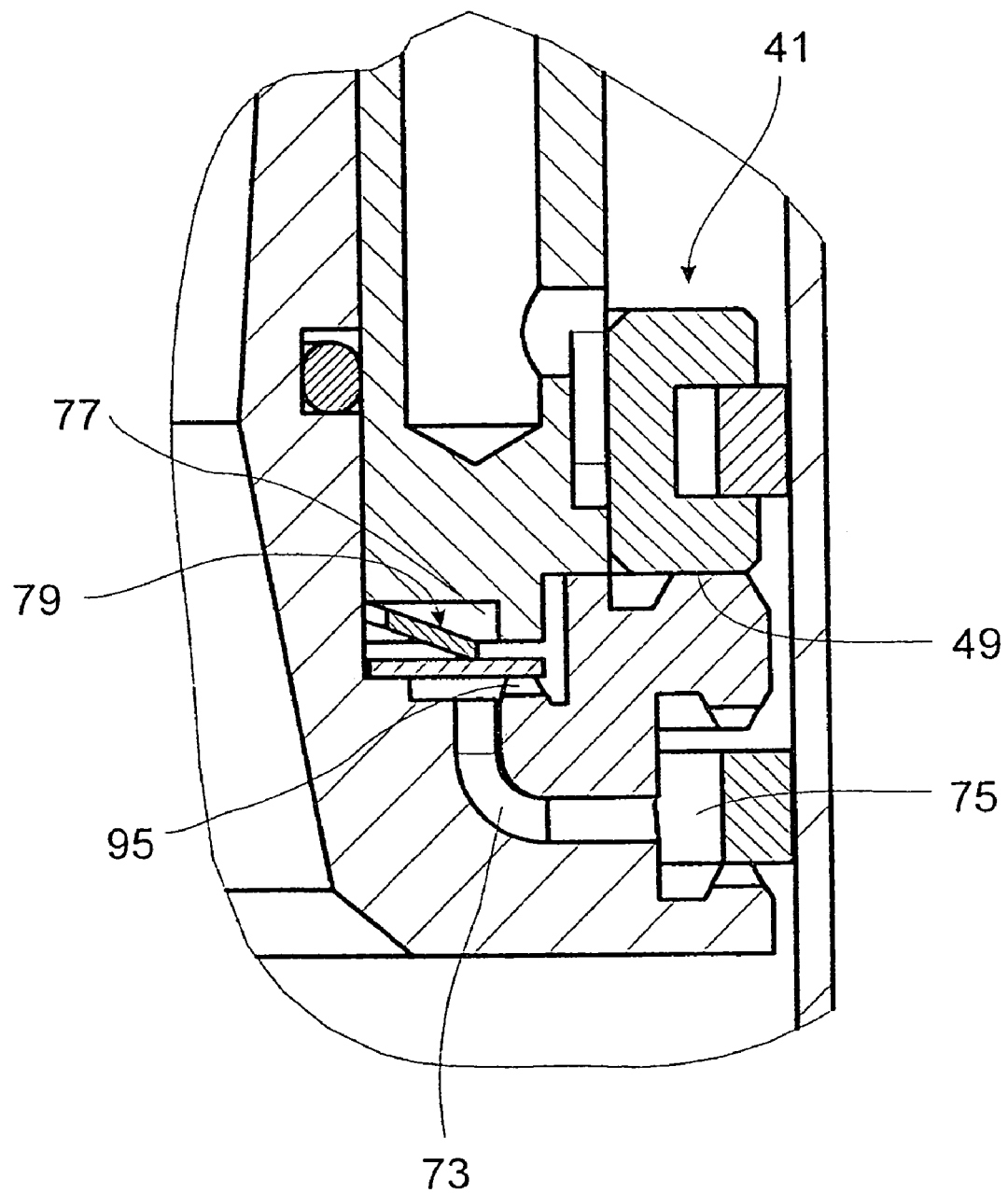
Figure 28:
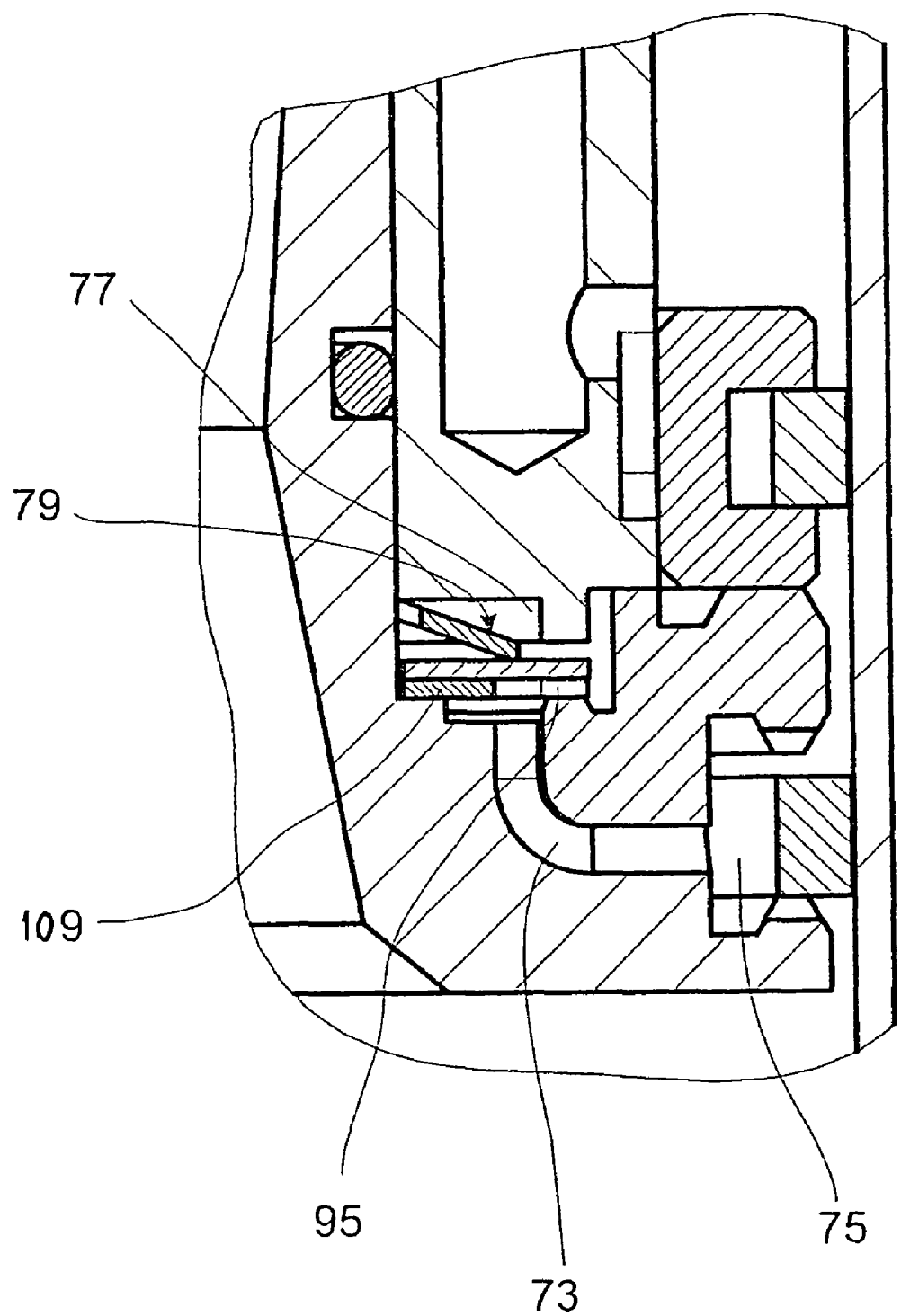
FIG. 28 is a sectional view of a pilot opening cross section inside a valve disk for the check valve.

FIGS. 25-28 show an embodiment of the piston arrangement in which the pilot opening cross sections 91, 95 are components of the check valves 67, 79. The pilot opening cross section 91, 95 can be formed by notches inside the valve seating surfaces of the check valves 67, 79 or, as FIG. 28 shows, by the pilot opening disk 109.

When the piston rod 5 travels outward, the damping medium from the working space 7 passes through the flow connection 56 and reaches the switching ring groove 59. A partial stream is guided through the connection 57 and the open check valve 67 to the blind holes 33. A second partial stream passes through the inflow cross section 65 to the annular space 46. As described above, the damping medium can flow from the annular space 46 through the transverse opening 87 (FIG. 18) into the blind holes 35, and as a result also into the annular space 77. Of course, when the switching ring 41 is in the position shown in FIG. 26, there is a connection between the two annular spaces 46, 48 via the longitudinal profile 37 of the spacer sleeve 31 (FIG. 17). The effective pilot opening cross section is determined here by the adjacent cross section 85.

In FIG. 27, the switching ring 41 has reached the stop surface 49. In contrast to the previous embodiment, the stop surface 49 has no radial grooves or other openings, so that no damping medium can flow from the blind holes 33 or the longitudinal profile 37 toward the switching ring groove 75. Only the damping medium which has arrived in the annular space 77 via the transverse openings 87 and the blind holes 35 can reach the connection 73 and thus the adjacent cross section 85 via the pilot opening cross section 95 in the valve seating surface of the check valve 79 (FIG. 27) or via the pilot opening cross section inside the pilot opening disk 109 (FIG. 28). The flow routes described on the basis of FIGS. 22-28 are also available in a functionally equivalent manner for the damping medium displaced in the inward-travel direction.

FIGS. 29 and 30 show an axially divided pilot opening ring 51a, 51b; 53a, 53b with a design which can be used independently of the configuration of the flow routes and pilot opening cross sections. A valve disk 101, 103 is clamped between the two ring parts 51a, 51b; 53a, 53b of the pilot opening ring. The valve disk 101, 103 has a radial opening, which determines the inflow cross section 65, 83. In addition, a valve disk 105 providing the adjacent cross section 63 is located between the pilot opening ring part 51b and the distributor ring 55 and a valve disk 107 providing the adjacent cross section 85 is arranged between the pilot opening ring part 53b and the sleeve-shaped base carrier 23. As a result of this stacking of the valve disks 101, 103, 105, 107 and ring parts 51a, 51b; 53a, 53b, it is possible to eliminate the need to stamp the adjacent and inflow cross sections into the pilot opening ring 51, 53. In general, this idea for the valve disks 105, 107 can also be applied to a one-piece pilot opening ring 51, 53.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper with an amplitude-selective damping force, comprising:

a damping medium-filled cylinder and a piston rod axially movably guided in said cylinder and carrying a piston arrangement which divides said cylinder into a first working space on one axial side of said piston arrangement and a second working space on the opposing axial side of said piston arrangement;

an axially movable switching ring arranged on said piston arrangement for axial movement between two stop surfaces on said piston arrangement, said switching ring controlling a flow connection between said first and second working spaces in response to an amplitude of movement of said piston rod, said flow connection being defined by said piston arrangement and said cylinder, said piston arrangement having a working surface defining a pilot opening cross section to said flow connection when said switching ring is positioned against one of said stop surfaces, said piston arrangement further defining a bypass channel arranged parallel to said flow connection and having at least two connecting openings to said flow connection, at least one of said two connecting openings being arranged upstream of one of said stop surfaces in each flow direction, said piston arrangement comprises a spacer sleeve defining said bypass channel, wherein an outside surface of said spacer sleeve defines a longitudinal profile allowing a flow to pass between said switching ring and said spacer sleeve; and a check valve arrangement separating said flow connection from said bypass channel in each of said flow directions, said check valve arrangement comprising two check valves which close in opposing directions.

2. The vibration damper of claim 1, wherein said bypass channel includes blind holes defined in said piston arrangement and connected to each other by transverse openings.

3. The vibration damper of claim 1, wherein said piston arrangement comprises a distributor ring defining a connection leading to said flow connection and to said bypass channel.

4. The vibration damper of claim 1, wherein at least one of said stop surfaces defines said pilot opening cross section.

5. The vibration damper of claim 1, further comprising a pilot opening ring preceding said flow connection and an axially movable valve ring, wherein a switching position of said valve ring determines an inflow cross section and an adjacent cross section for flow through said flow connection.

6. The vibration damper of claim 5, wherein said inflow cross section leading to said flow connection is smaller than said adjacent cross section.

7. The vibration damper of claim 5, wherein said piston arrangement comprises a distributor ring defining a connection leading to said flow connection and to said bypass channel, said pilot opening ring and said distributor ring form the boundaries of an annular space in which one of said check valves is arranged.

8. The vibration damper of claim 7, wherein said piston arrangement comprises a spacer sleeve defining said bypass channel, said pilot opening ring and said sleeve-shaped base cater together form a switching ring groove in which said valve ring is axially movably arranged.

9. The vibration damper of claim 1, wherein said pilot opening cross section is defined outside the surfaces of said piston arrangement which form the boundaries of annular spaces separated by said switching ring.

10. The vibration damper of claim 1, wherein said pilot opening cross section is arranged on the outflow side of at least one annular space containing one of said check valves.

11. The vibration damper of claim 10, further comprising a pilot opening ring preceding said flow connection and an axially movable valve ring, wherein a switching position of said valve ring determines an inflow cross section and an adjacent cross section for flow through said flow connection, wherein said piston arrangement comprises a spacer sleeve defining said bypass channel and said pilot opening cross section is provided between said spacer sleeve and said pilot opening ring.

12. The vibration damper of claim 10, wherein said pilot opening cross section is defined at least partially by a component of one of said check valves.

13. The vibration damper of claim 12, wherein said one of said check valves comprises a valve seating surface in which said pilot opening cross section is arranged.

14. The vibration damper of claim 12, wherein said pilot opening cross section is formed by at least one pilot opening disk.

15. The vibration damper of claim 5, wherein said pilot opening ring is divided axially into two parts and a valve disk containing the inflow cross section is clamped between said two parts of said pilot opening ring.

16. The vibration damper of claim 5, wherein said adjacent cross section is inside a valve disk.

17. The vibration damper of claim 16, wherein said valve disk is clamped onto said piston arrangement by said pilot opening ring.

18. A vibration damper with an amplitude-selective damping force, comprising:

a damping medium-filled cylinder and a piston rod axially movably guided in said cylinder and carrying a piston arrangement which divides said cylinder into a first working space on one axial side of said piston arrangement and a second working space on the opposing axial side of said piston arrangement;

an axially movable switching ring arranged on said piston arrangement for axial movement between two stop surfaces on said piston arrangement, said switching ring controlling a flow connection between said first and second working spaces in response to an amplitude of movement of said piston rod, said flow connection being defined by said piston arrangement and said cylinder, said piston arrangement having a working surface defining a pilot opening cross section to said flow connection when said switching ring is positioned against one of said stop surfaces, said piston arrangement further defining a bypass channel arranged parallel to said flow connection and having at least two connecting openings to said flow connection, at least one of said two connecting openings being arranged upstream of one of said stop surfaces in each flow direction; and a check valve arrangement separating said flow connection from said bypass channel in each of said flow directions, said check valve arrangement comprising two check valves which close in opposing directions, wherein said pilot opening cross section includes a first pilot opening cross section for inward travel of said piston rod and a second pilot opening cross section for outward travel of said piston rod, a size of said pilot opening cross section for inward travel of said piston rod is different from a size of said pilot opening cross section for outward navel of said piston rod.

* * * * *